(12) United States Patent
Shoji

(10) Patent No.: US 11,123,872 B2
(45) Date of Patent: Sep. 21, 2021

(54) CONTROL APPARATUS THAT CONTROLS ARM FOR GRIPPING OBJECT

(71) Applicant: KYOCERA Document Solutions Inc., Osaka (JP)

(72) Inventor: Haruki Shoji, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 179 days.

(21) Appl. No.: 16/711,503

(22) Filed: Dec. 12, 2019

(65) Prior Publication Data

US 2020/0189116 A1 Jun. 18, 2020

(30) Foreign Application Priority Data

Dec. 17, 2018 (JP) .............................. JP2018-235633

(51) Int. Cl.
*B25J 9/16* (2006.01)
*B25J 13/00* (2006.01)

(52) U.S. Cl.
CPC ........... *B25J 9/1697* (2013.01); *B25J 9/1607* (2013.01)

(58) Field of Classification Search
CPC ...... B25J 9/1697; B25J 9/1607; B25J 9/1612; B25J 9/1633; B25J 13/00; G05B 2219/39507
USPC ................................................ 700/245–264
See application file for complete search history.

(56) References Cited

U.S. PATENT DOCUMENTS

| 7,888,900 B2* | 2/2011 | Okamoto ............... B25J 13/083 318/568.21 |
| 8,644,986 B2* | 2/2014 | Tsuboi ................. G05B 13/021 700/245 |
| 9,144,908 B2* | 9/2015 | Saen ...................... B25J 13/085 |
| 10,744,654 B2* | 8/2020 | Li ............................ B25J 15/10 |
| 11,027,424 B2* | 6/2021 | Umeyama .............. B25J 9/1612 |
| 2009/0018700 A1* | 1/2009 | Okamoto ............... B25J 9/1612 700/260 |
| 2009/0076657 A1* | 3/2009 | Tsuboi ................... B25J 9/1612 700/275 |
| 2009/0302626 A1* | 12/2009 | Dollar ...................... B25J 9/104 294/106 |
| 2012/0310411 A1* | 12/2012 | Tsuboi .................. B25J 13/088 700/245 |
| 2013/0090763 A1* | 4/2013 | Simaan .................... A61B 5/11 700/258 |

(Continued)

FOREIGN PATENT DOCUMENTS

JP 2003-127081 A 5/2003
JP 2005-177977 A 7/2005

*Primary Examiner* — Jaime Figueroa
(74) *Attorney, Agent, or Firm* — IP Business Solutions, LLC

(57) ABSTRACT

A control apparatus includes a robot having an arm, a driver, an end effector, a first detector, and a second detector, and a control device. The control device acts as a third detector, a calculator, and a controller. The third detector detects a slip direction of the object held by the end effector. The calculator calculates an angle defined by the slip direction detected by the third detector and a direction opposite to gravity. The controller causes the end effector holding the object to pivot by the angle calculated by the calculator, to align the slip direction detected by the third detector with the direction opposite to gravity.

8 Claims, 7 Drawing Sheets

(56) References Cited

U.S. PATENT DOCUMENTS

| | | | |
|---|---|---|---|
| 2013/0242455 A1* | 9/2013 | Prahlad | B25J 15/00 |
| | | | 361/234 |
| 2014/0147240 A1* | 5/2014 | Noda | B25J 19/021 |
| | | | 414/751.1 |
| 2014/0148951 A1* | 5/2014 | Saen | B25J 15/0253 |
| | | | 700/259 |
| 2016/0001448 A1* | 1/2016 | Rothfuss | B25J 15/028 |
| | | | 294/192 |
| 2016/0059408 A1* | 3/2016 | Isobe | B25J 9/162 |
| | | | 700/253 |
| 2019/0001491 A1* | 1/2019 | Umeyama | B25J 15/0009 |
| 2019/0001508 A1* | 1/2019 | Li | B25J 15/0009 |
| 2019/0176326 A1* | 6/2019 | Bingham | B25J 9/161 |
| 2021/0129347 A1* | 5/2021 | Nagakari | B25J 13/085 |

\* cited by examiner

CONTROL APPARATUS THAT CONTROLS ARM FOR GRIPPING OBJECT

INCORPORATION BY REFERENCE

This application claims priority to Japanese Patent Application No. 2018-235633 filed on Dec. 17, 2018, the entire contents of which are incorporated by reference herein.

BACKGROUND

The present disclosure relates to a control apparatus that controls an arm for gripping an object.

A typical robot control system includes an arm that holds an object to be gripped, called "work", and a control apparatus that controls the arm. For example, the control apparatus controls the arm so as to perform a pick-and-place operation, including holding (picking up) the work with an effector (e.g., a hand simulating fingers, a gripper simulating claws) attached to a distal end of the arm, transporting the work to a target position, and placing the work on the target position.

SUMMARY

According to an aspect of the present disclosure, a control apparatus that controls an operation of a robot includes a control device. The robot includes an arm, a driver, an end effector, a first detector, and a second detector. The arm includes a plurality of joints, and is capable of freely moving in a three-dimensional space. The driver is provided in each of the plurality of joints, to drive the joint. The end effector is attached to a distal end of the arm, and holds an object. The first detector detects a position of the end effector. The second detector detects a torque with which the end effector holds the object. The control device includes a processor, and acts, when the processor executes a control program, as a third detector, a calculator, and a controller. The third detector detects a slip direction of the object held by the end effector. The calculator calculates an angle defined by the slip direction detected by the third detector and a direction opposite to a gravity direction. The controller causes the end effector holding the object to pivot by the angle calculated by the calculator, to align the slip direction detected by the third detector with the direction opposite to the gravity direction.

DETAILED DESCRIPTION

Figure 1:
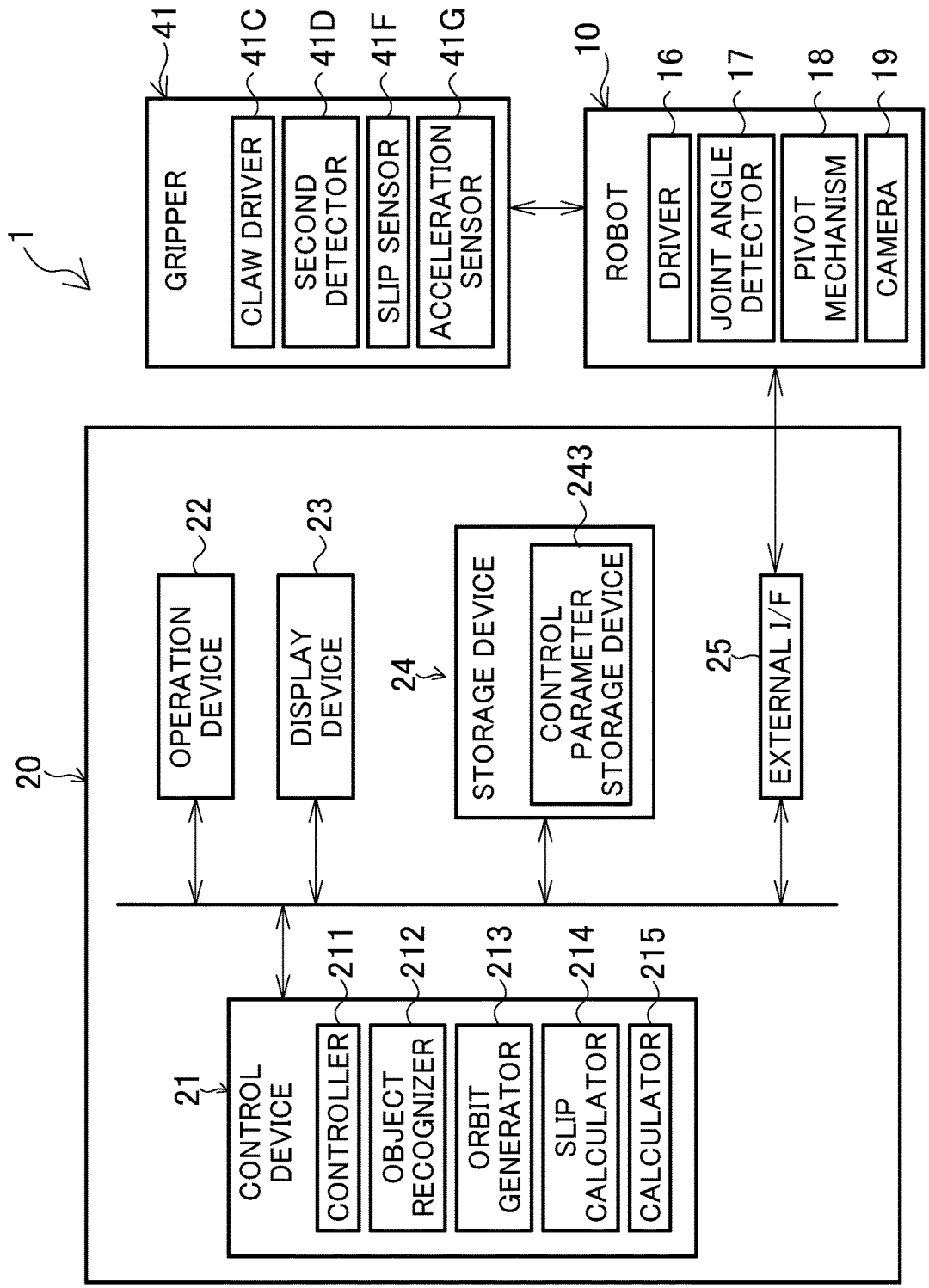
FIG. 1 is a schematic diagram illustrating a functional block configuration of an essential internal configuration of a control apparatus, constituting a robot control system according to an embodiment of the disclosure.
Figure 2:
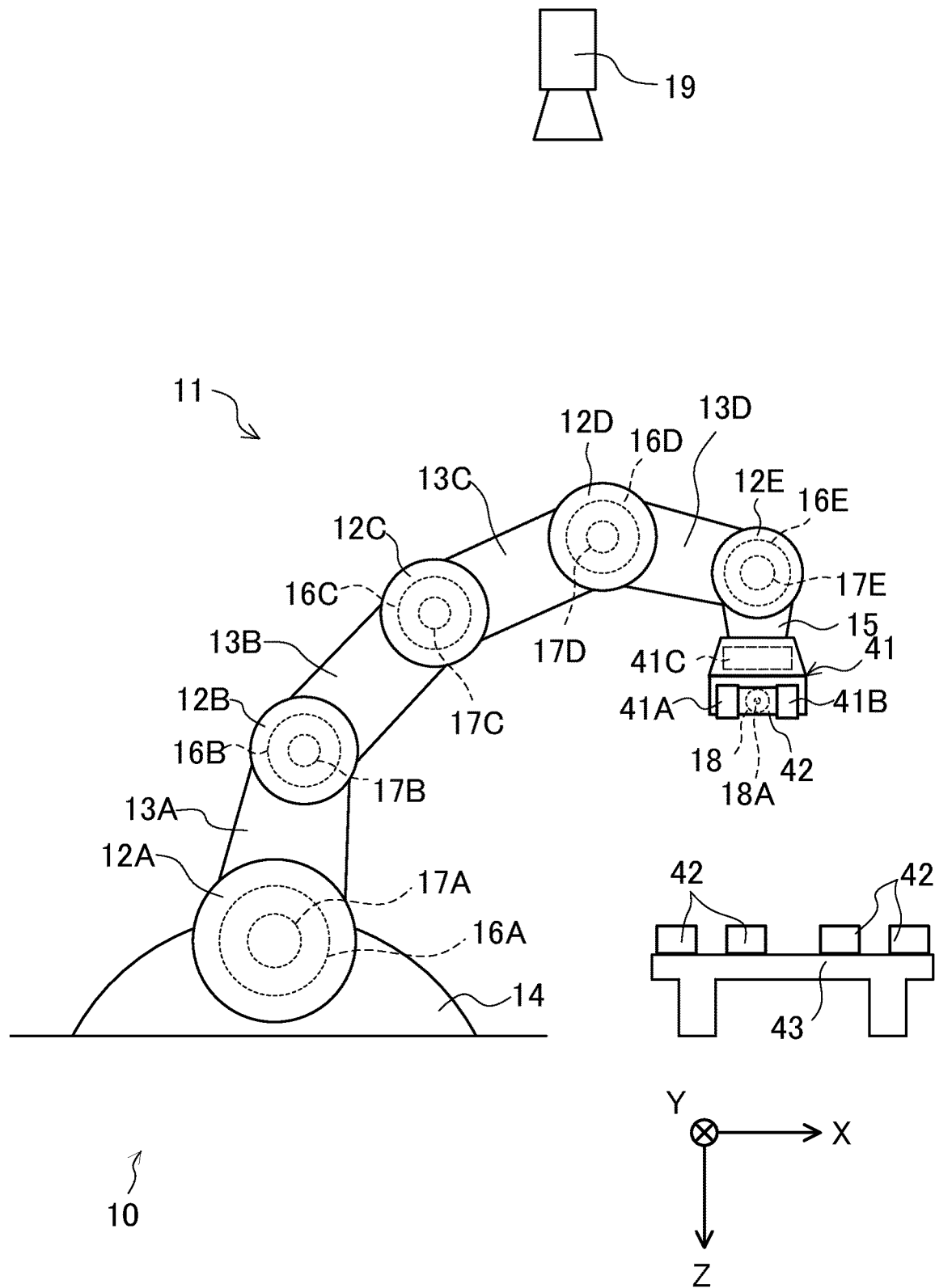
FIG. 2 is a schematic diagram illustrating the appearance of a robot to be controlled.

Hereafter, a control apparatus according to an embodiment of the disclosure will be described, with reference to the drawings. FIG. 1 is a schematic diagram illustrating a functional block configuration of an essential internal configuration of the control apparatus according to the embodiment of the disclosure. FIG. 2 is a schematic diagram illustrating the appearance of a robot to be controlled.

The robot control system 1 includes a robot 10, and a control apparatus (robot control apparatus) 20 that controls the operation of the robot 10.

The robot 10 is, as illustrated in FIG. 2, a manipulator having a motor function similar to that of a human arm, and includes an arm 11 capable of freely moving in a three-dimensional space, the base portion of the arm 11 being fixed to a pedestal 14. The arm 11 includes a plurality of joints 12A to 12E (hereinafter, collectively "joint 12" as the case may be), and links 13A to 13D each connecting the joints 12.

In addition, an end effector is pivotably attached to the distal end portion 15 of the arm 11. To be more detailed, the end effector is attached to a pivot mechanism 18 (e.g., stepping motor) provided at the distal end portion 15 of the arm 11.

The end effector illustrated in FIG. 2 includes a gripper 41 having a pair of claws 41A and 41B located parallel to each other. The gripper 41 is used, for example, to grip a work (object to be gripped) 42 placed on a table 43, and transport the work 42 to a desired location. In FIG. 2, the pivot mechanism 18 is configured to pivot the gripper 41 about a pivotal shaft 18A defined along a Y-axis direction in an X-Y plane (horizontal plane), with the pivotal shaft located at a position corresponding to the center of the work 42. Such an arrangement prevents the work 42 from slipping and coming off, owing to a centrifugal force applied to the work 42. Here, although it is preferable that the pivotal shaft of the pivot mechanism 18 is located at the position corresponding to the center of the work 42, the pivot mechanism 18 may be set with the pivotal shaft deviated from the center of the work 42.

The gripper 41 also includes thereinside a claw driver 41C (e.g., a cylinder) that drives the claws 41A and 41B, with pneumatic pressure.

Further, the gripper 41 includes a second detector (torque detector) 41D that detects a grip torque for gripping the work 42 (i.e., grip force exerted by the claws 41A and 41B). The second detector 41D may be, for example, a torque sensor.

On the surface of each of the claws 41A and 41B of the gripper 41 opposed to the work 42, a known slip sensor 41F is provided. The slip sensor 41F makes it possible to detect a slip of the work 42 held by the claws 41A and 41B of the gripper 41. To be more detailed, the respective slip sensors 41F of the claw 41A and the claw 41B are capable of detecting a slip distance and a slip direction, and a detection signal is outputted from each of the slip sensors 41F to the control apparatus 20 via the robot 10.

The gripper 41 further includes an acceleration sensor 41G. The acceleration sensor 41G makes it possible to detect a gravity direction.

The robot 10 includes drivers (joint drivers) 16A to 16E (hereinafter, collectively "driver 16" as the case may be) provided in the respective joints 12 to drive the same, joint angle detectors 17A to 17E (hereinafter, collectively "joint angle detector 17" as the case may be) provided in the respective joints 12 to detect an angle of the same, and a camera 19 located above the robot 10. The driver 16 and the joint angle detector 17 may be exemplified by a motor and an encoder, respectively.

The joint angle detector 17 exemplifies the first detector (position detector) in the disclosure. The position of the distal end portion 15 of the arm 11 can be obtained from the respective angles of all the joints 12A to 12E. Here, the camera 19 that shoots the entirety of the robot 10 may also be utilized as the first detector.

The control apparatus 20 includes a control device 21, an operation device 22, a display device 23, a storage device 24, and an external interface (I/F) 25.

The operation device 22 includes a keyboard, a mouse, a touch panel and so forth, and is used to input commands and characters in the control device 21, and to operate a pointer on the screen of the display device 23. The display device 23 displays a response from the control device 21, a data result, and so forth. The operation device 22 is utilized, for example, to input an instruction of a target destination of the distal end portion 15 of the arm 11 (e.g., position to place the object to be gripped, namely the work 42).

The storage device 24 is constituted of, for example, a hard disk drive (HDD) for storing programs and data necessary for the operation of the control apparatus 20, and includes a control parameter storage device 243.

The control parameter storage device 243 contains control parameters used for the pickup operation, and a pivotal operation and placing operation to be subsequently described.

The external I/F 25 is used for connection with an external apparatus. The control apparatus 20 is connected to the driver 16, the joint angle detector 17, the pivot mechanism 18, and the camera 19 constituting the robot 10 via the external I/F 25, and also to the claw driver 41C, the second detector 41D, the slip sensor 41F, and the acceleration sensor 41G, via the robot 10.

The control device 21 includes a processor, a random-access memory (RAM), a read-only memory (ROM), and an exclusive hardware circuit. The processor is, for example, a central processing unit (CPU), an application specific integrated circuit (ASIC), a micro processing unit (MPU), or a graphics processing unit (GPU). The control device 21 includes a controller (robot controller) 211, an object recognizer 212, an orbit generator 213, a slip calculator 214, and a calculator (angle calculator) 215.

The control device 21 acts as a controller 211, the object recognizer 212, the orbit generator 213, the slip calculator 214, and the calculator 215, when the processor executes a control program stored in the storage device 24. However, the mentioned functions of the control device 21 may each be constituted of a hardware circuit, instead of being operated by the control device 21 in accordance with the control program. This also applies to other embodiments, unless otherwise specifically noted.

The controller 211 serves to control the overall operation of the control apparatus 20. The controller 211 is connected to the operation device 22, the display device 23, the storage device 24, and the external I/F 25, to control the operation of the mentioned components, and transmit and receive signals and data, to and from those components.

The object recognizer 212 performs object recognition, for example through pattern matching or machine learning, based on the image data acquired by the camera 19, to recognize the object to be gripped, namely the work 42, and detect the position thereof. The position corresponds to the terminal point of the pickup operation.

The orbit generator 213 generates, on the basis of the position of the work 42 detected by the object recognizer 212 (terminal point of the pickup operation), a target orbit for the distal end portion 15 of the arm 11, from the current position to the terminal point. The orbit generator 213 also generates, on the basis of the position where the work 42 is to be placed, instructed by the user via the operation device 22 (terminal point of the placing operation), a target orbit for the distal end portion 15 of the arm 11, from the position where the work 42 is picked up to the terminal point. To generate the orbit, various types of generation algorithm, such as a rapidly exploring random tree (RRT), may be employed.

The slip calculator 214 calculates, by computing, the slip distance and the slip direction of the work 42 gripped (picked up) by the gripper 41, on the basis of the detection signals from the respective slip sensors 41F if the claw 41A and the claw 41B.

Figure 5A:
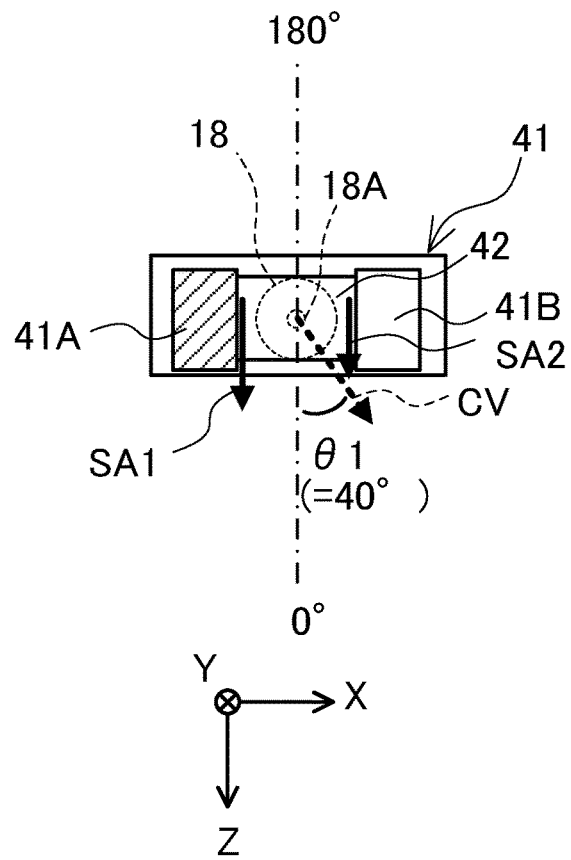
FIG. 5A is a schematic drawing for explaining a calculation method of a slip direction of a work, performed by a slip calculator.

More specifically, the slip calculator 214 calculates, for example as illustrated in FIG. 5A, a synthesized vector CV (i.e., the direction in which the work 42 has slipped, and the distance of the slip) composed of a slip vector SA1 indicated by the detection signal from the slip sensor 41F of the claw 41A (slipped in a Z-direction, by a first slip distance SL1) and a slip vector SA2 indicated by the detection signal from the slip sensor 41F of the claw 41B (slipped in the Z-direction, by a second slip distance SL2 shorter than the first slip distance SL1).

Since the slip distance of the work 42 on the side of the claw 41A (first slip distance SL1) and the slip distance of the work 42 on the side of the claw 41B (second slip distance SL2) are different from each other as illustrated in FIG. 5A, the slip direction of the work 42 is downward, but different from the gravity direction. To be more detailed, as illustrated in FIG. 5B, the slip calculator 214 calculates an angle $\theta 1$ defined by the slip direction of the work 42 with respect to the gravity direction, by the following equation (1).

$$\text{Angle } \theta 1 = \text{Arctan}(L/(SL1-SL2)) \qquad (1)$$

In this equation, L represents the distance between the claw 41A and the claw 41B (corresponding to the length of the work), SL1 represents the slip distance of the work 42 on the side of the claw 41A (first slip distance SL1), and SL2 represents the slip distance of the work 42 on the side of the claw 41B (second slip distance SL2).

Figure 5C:
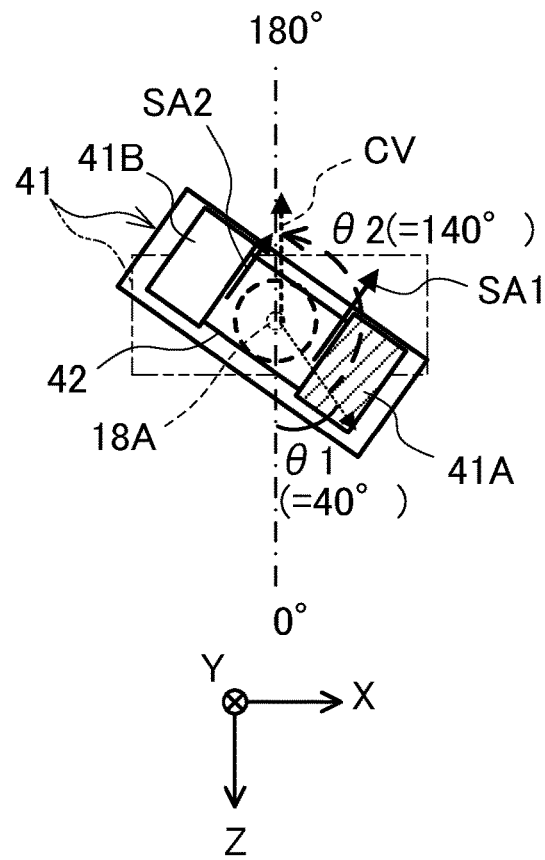
FIG. 5C is a schematic diagram illustrating a gripper pivoted by a pivot angle calculated by a calculator.
Figure 5B:
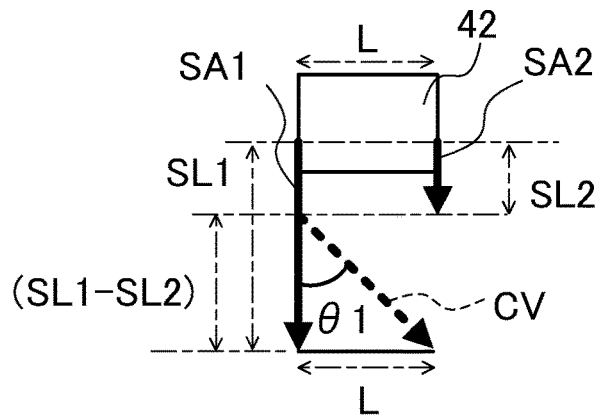
FIG. 5B is a schematic diagram illustrating a relation between slip vectors and a synthesized vector.

In FIG. 5A and FIG. 5B, the slip calculator 214 calculates the angle $\theta 1$ defined by the slip direction of the work 42 with respect to the gravity direction (Z-direction), as 40°. Here, the respective slip sensors 41F of the claw 41A and the claw 41B, and the slip calculator 214 exemplify the third detector (slip direction detector) in the disclosure.

It is to be noted that in FIG. 5A and FIG. 5C, only the claw 41A is hatched and the claw 41B is left blank, for the sake of clarity in the explanation of the pivotal motion of the gripper 41.

The calculator 215 calculates an angle $\theta 2$ defined by the slip direction calculated by the slip calculator 214, with respect to the direction opposite to the gravity direction. More specifically, the calculator 215 calculates the angle $\theta 2$ between the slip direction calculated by the slip calculator 214 (40° with respect to the gravity direction (Z-direction) in FIG. 5A) and the direction opposite to the gravity direction detected by the acceleration sensor 41G of the gripper 41 (i.e., Z-direction, which is the direction of 0°), in other words the direction opposite to the Z-direction, which is the direction of 180°. Thus, the angle θ2 is calculated as 140°, by subtracting 40° from 180°.

Here, although the gravity direction (Z-direction) detected by the acceleration sensor 41G is adopted in this embodiment, coordinate data indicating the Z-direction in the three-dimensional space (based on XYZ-coordinate system) of the robot 10 may be stored in the storage device 24 in advance, and the coordinate data of the gravity direction (Z-direction) may be read out from the storage device 24 when necessary. In this case, the acceleration sensor 41G may be omitted.

The controller 211 causes the gripper 41 holding the work 42 to pivot about the pivotal shaft 18A located at the position corresponding to the center of the work 42, by the angle calculated by the calculator 215 (140° in FIG. 5A), so that the slip direction calculated by the slip calculator 214 is aligned with the direction opposite to the gravity direction, as illustrated in FIG. 5C in which the gripper 41 has been pivoted by the angle calculated by the calculator 215 (i.e., 140°). By the mentioned pivotal motion, the slip direction if the work 42 illustrated in FIG. 5A is turned to the direction opposite to the gravity direction. In this state, the force applied to the work 42 held by the gripper 41 in the slip direction can be balanced with the gravity, which may lead to cancellation of the slip of the work 42. In other words, the work 42 can be held in a posture that prevents the work 42 from slipping.

In addition, since the gripper 41 is made to pivot about the pivotal shaft of the pivot mechanism 18 located at the position corresponding to the center of the work 42, the work 42 can be prevented from slipping and coming off, owing to a centrifugal force applied to the work 42.

When the slip calculator 214 detects a downward slip with respect to the horizontal plane, in the state that the gripper 41 holding the work 42 has been pivoted by the angle calculated by the calculator 215, the controller 211 increases the grip torque of the gripper 41, so as to set the grip torque of the gripper 41 to the torque detected by the second detector 41D when the slip distance of the work 42 has become zero.

On the contrary, when the slip calculator 214 detects an upward slip with respect to the horizontal plane, in the state that the gripper 41 holding the work 42 has been pivoted by the angle calculated by the calculator 215, the controller 211 decreases the grip torque of the gripper 41, so as to maintain the grip torque of the gripper 41 at the torque detected by the second detector 41D when the slip distance of the work 42 has become zero.

The controller 211 drives the gripper 41 holding the work 42 in the gravity direction (Z-direction), by an accelerating or decelerating operation.

The controller 211 controls the operation of the driver 16, using a control parameter appropriate for the current status of the robot 10, on the basis of the target orbit generated by the orbit generator 213 (e.g., target position, target speed, and target acceleration), and the position, speed, and acceleration of the distal end portion 15 of the arm 11, so as to allow the distal end portion 15 to follow up the target orbit.

The controller 211 also stores the latest control parameters used in the pickup operation, and in the pivotal operation and placing operation to be subsequently described, in the control parameter storage device 243.

Figure 3:
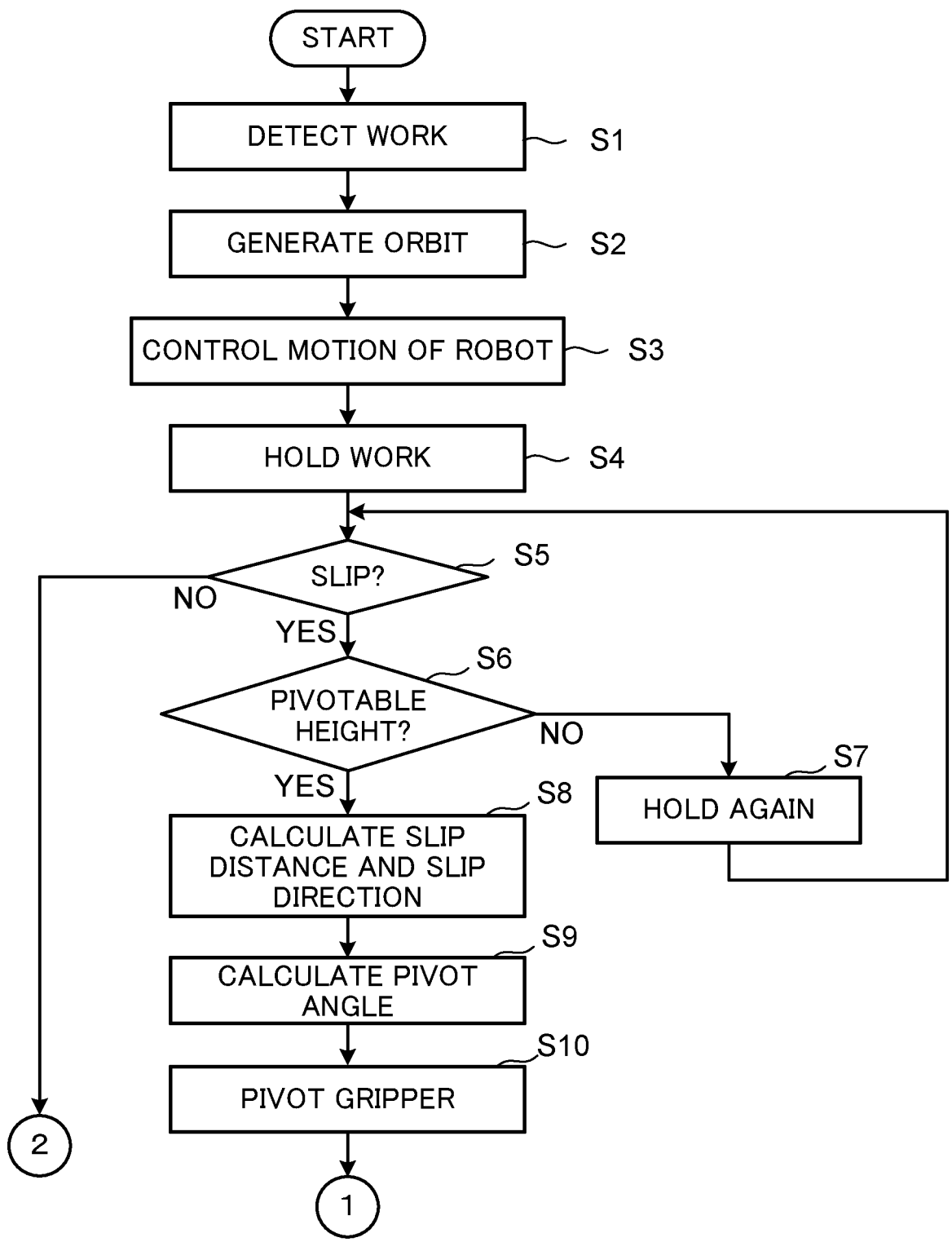
FIG. 3 is a flowchart of an operation performed by a control device of the control apparatus.
Figure 4:
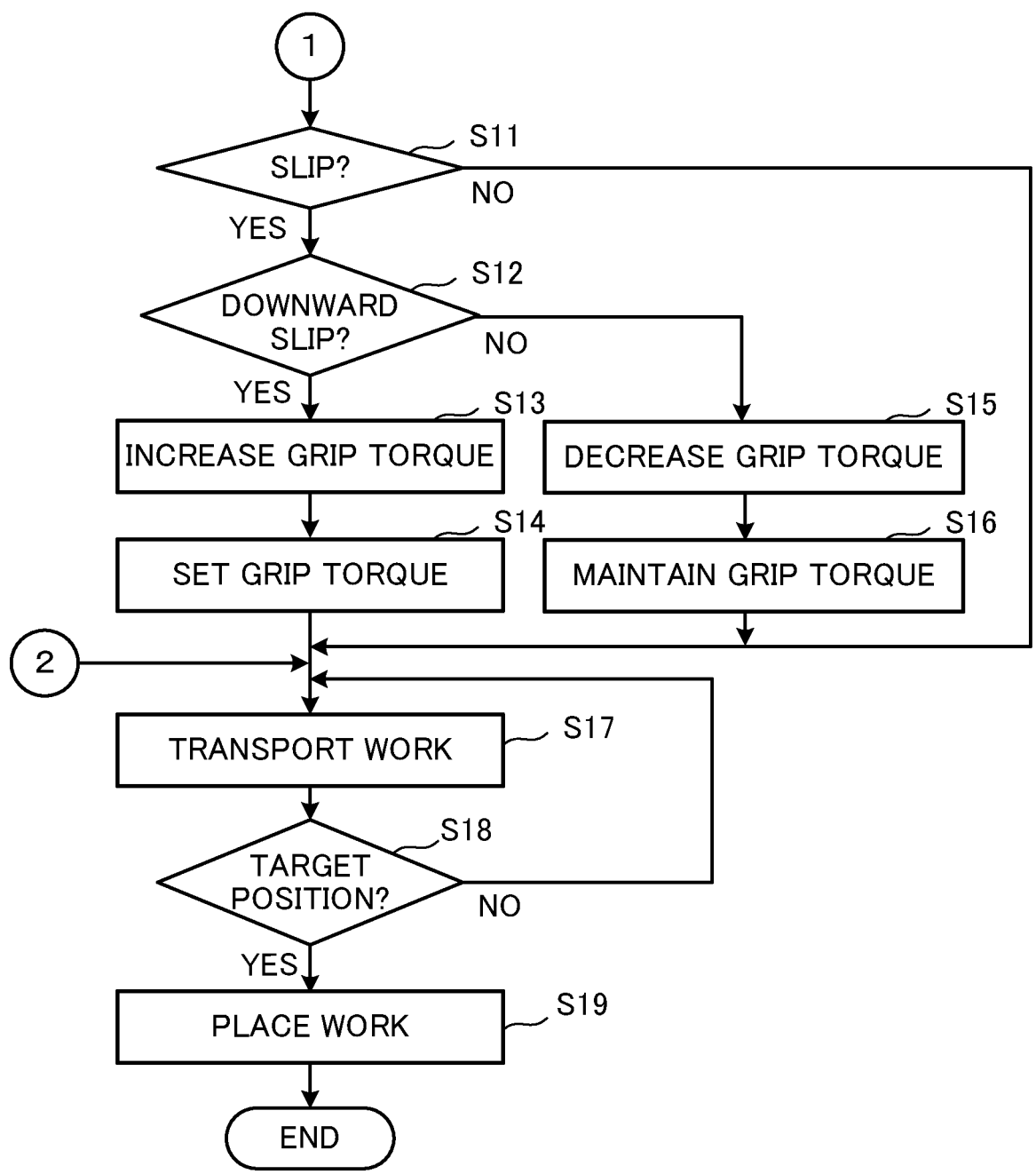
FIG. 4 is a flowchart of an operation that follows the operation of FIG. 3.

Referring now to flowcharts of FIG. 3 and FIG. 4, an operation performed by the control device 21 of the control apparatus 20 will be described hereunder. The following operation corresponds to the pick-and-place operation performed by the robot 10.

First, the object recognizer 212 recognizes the object to be gripped, namely the work 42, on the basis of the image data acquired through the camera 19, and detects the position of the work 42 (terminal point of the pickup operation) (S1). Then the orbit generator 213 generates the target orbit for the distal end portion 15 of the arm 11, from the current position to the terminal point, on the basis of the position of the work 42 detected by the object recognizer 212 (S2).

The controller 211 then determines the motion range of the driver 16 using the control parameter, so as to minimize the deviation between the target position, target speed, and target acceleration of the distal end portion 15 at the next time, indicated by the target orbit generated by the orbit generator 213, and the position, speed, and acceleration of the distal end portion 15 acquired from the detection result provided by the joint angle detector 17 of the robot 10, and accordingly controls the motion of the driver 16 (S3).

The controller 211 picks up (holds) the work 42 recognized at S1 by the object recognizer 212, with the claws 41A and 41B of the gripper 41 (S4).

The controller 211 decides whether the work 42 has slipped, on the basis of the detection signals of the respective slip sensors 41F of the claw 41A and the claw 41B (S5).

Upon deciding that the work 42 has slipped (YES at S5), the controller 211 decides whether the gripper 41 holding the work 42 is at a height that allows the gripper 41 to pivot (S6).

Upon deciding that the gripper 41 is not at the height that allows the gripper 41 to pivot (NO at S6), the controller 211 places the work 42. Then the controller 211 increases the grip torque of the gripper 41 from a torque of the immediately preceding time, and causes the gripper 41 to again hold the work 42 (S7).

In contrast, when the controller 211 decides that the gripper 41 is not at the height that allows the gripper 41 to pivot (YES at S6), slip calculator 214 calculates, by computing, the slip distance and the slip direction of the work 42 held (picked up) by the gripper 41, on the basis of the detection signals of the respective slip sensors 41F of the claw 41A and the claw 41B (S8).

To be more detailed, the slip calculator 214 calculates, for example as illustrated in FIG. 5A, the synthesized vector CV (i.e., the direction in which the work 42 has slipped, and the distance of the slip) composed of the slip vector SA1 indicated by the detection signal from the slip sensor 41F of the claw 41A (slipped in the Z-direction, by the first slip distance SL1) and the slip vector SA2 indicated by the detection signal from the slip sensor 41F of the claw 41B (slipped in the Z-direction, by a second slip distance SL2 shorter than the first slip distance SL1). As illustrated in FIG. 5B, the direction of the synthesized vector CV corresponds to the slip direction of the work 42, and the length of the synthesized vector CV corresponds to the synthesized slip distance of the work 42. Since the slip distance of the work 42 on the side of the claw 41A (first slip distance SL1) and the slip distance of the work 42 on the side of the claw 41B (second slip distance SL2) are different from each other as illustrated in FIG. 5A, it is calculated that the slip direction of the work 42 is downward, but different from the gravity direction (40° with respect to the gravity direction (Z-direction) in FIG. 5A).

The calculator 215 calculates the angle θ2 between the slip direction calculated by the slip calculator 214 and the direction opposite to the gravity direction (S9). More specifically, the calculator 215 calculates the angle θ2 between the slip direction calculated by the slip calculator 214 (40° with respect to the gravity direction (Z-direction) in FIG. 5A) and the direction opposite to the gravity direction detected by the acceleration sensor 41G of the gripper 41 (i.e., Z-direction, which is the direction of 0°), in other words the direction opposite to the Z-direction, which is the direction of 180°. Thus, the angle θ2 is calculated as 140°, by subtracting 40° from 180°.

The controller 211 causes the gripper 41 holding the work 42 to pivot about the pivotal shaft 18A located at the position corresponding to the center of the work 42, by the angle calculated by the calculator 215 (140° in FIG. 5A), so that the slip direction calculated by the slip calculator 214 is aligned with the direction opposite to the gravity direction, as illustrated in FIG. 5C in which the gripper 41 has been pivoted by the angle calculated by the calculator 215 (i.e., 140°) (S10). By the mentioned pivotal motion, the slip direction of the work 42 illustrated in FIG. 5A is turned to the direction opposite to the gravity direction. In this state, the force applied to the work 42 held by the gripper 41 in the slip direction can be balanced with the gravity, which may lead to cancellation of the slip of the work 42. In other words, the work 42 can be held in a posture that prevents the work 42 from slipping.

The controller 211 decides whether the work 42 has slipped after the gripper 41 was made to pivot, on the basis of the detection signals of the respective slip sensors 41F of the claw 41A and the claw 41B (S11).

When the controller 211 decides that the work 42 has not slipped after the gripper 41 was made to pivot (NO at S11), the operation proceeds to the transport of the work 42 (S17).

In contrast, when the controller 211 decides that the work 42 has slipped after the gripper 41 was made to pivot (YES at S11), the slip calculator 214 calculates, by computing, the slip distance and the slip direction of the work 42 held (picked up) by the gripper 41 that was made to pivot, on the basis of the detection signals of the respective slip sensors 41F of the claw 41A and the claw 41B.

Then the controller 211 decides whether the slip direction calculated by the slip calculator 214 is downward (S12). In other words, the controller 211 decides whether the work 42, held by the gripper 41 that was made to pivot, has slipped downward.

Upon deciding that the slip direction calculated by the slip calculator 214 is downward (YES at S12), the controller 211 increases the grip torque of the gripper 41 (S13), so as to set the grip torque of the gripper 41 to the torque detected by the second detector 41D when the slip distance of the work 42 becomes zero (S14).

In the case where a downward slip is detected with respect to a horizontal plane, after the gripper 41 is made to pivot such that the slip direction is aligned with the direction opposite to the gravity direction, it is presumed that basically the grip torque of the gripper 41 is insufficient, since the downward slip has taken place both before and after the gripper 41 was made to pivot. For example, when the slip vector SA1 on the side of the claw 41A and the slip vector SA2 on the side of the claw 41B are equal, the work 42 also slips in the gravity direction (Z-direction) after the work 42 is made to pivot by 180°, and therefore it can be construed that basically the grip torque of the gripper 41 is insufficient. When the downward slip takes place as above after the gripper 41 is made to pivot, the grip torque of the gripper 41 is increased, so as to set the grip torque of the gripper 41 to the torque detected by the second detector 41D when the slip distance of the work 42 becomes zero. Through such an arrangement, the grip torque of the gripper 41 can be set to an optimum value, to properly hold the work 42 without incurring a slip.

In contrast, upon deciding that the slip direction calculated by the slip calculator 214 is not downward but upward (NO at S12), the controller 211 decreases the grip torque of the gripper 41 (S15), and maintains the torque detected by the second detector 41D when the slip distance of the work 42 becomes zero (S16).

In the case where an upward slip is detected with respect to a horizontal plane, after the gripper 41 is made to pivot such that the slip direction is aligned with the direction opposite to the gravity direction, it is presumed that the grip torque of the gripper 41 is excessive. When the upward slip takes place as above after the gripper 41 is made to pivot, the grip torque of the gripper 41 is decreased, and the torque detected by the second detector 41D, when the slip distance of the work 42 becomes zero, is maintained. Through such an arrangement, the work 42 can be properly held without being made to slip, and therefore the power corresponding to the unnecessary grip force can be saved, which leads to reduced power consumption.

After S14 or S16, in the case of NO at S5, or in the case of NO at S11, the controller 211 transports the work 42 (S17).

The controller 211 then decides whether the distal end portion 15 of the arm 11 has reached the position where the work 42 is to be placed (i.e., target position) (S18). In the case where the distal end portion 15 of the arm 11 has not reached the target position (NO at S18), the operation returns to S17.

In contrast, in the case where the distal end portion 15 of the arm 11 has reached the target position (YES at S18), the controller 211 places the work 42 on the target position (S18).

To be more detailed, the orbit generator 213 generates, on the basis of the position where the work 42 is to be placed (terminal point of the placing operation) instructed by the user via the operation device 22, the target orbit for the distal end portion 15 of the arm 11, from the position where the work 42 has been picked up to the terminal point. The controller 211 transports the work 42 along the target orbit, and places the work 42 on the target position. For example, the controller 211 resets the gripper 41 thus far in the pivoted posture to the horizontal posture, and then places the work 42 on the target position.

When there is another work 42 to be transported, the controller 211 repeats the operation of S1 to S19, otherwise controller 211 finishes the operation.

According to this embodiment, the slip calculator 214 calculates the slip direction of the work 42 held by the gripper 41, namely the direction of the angle θ1 with respect to the gravity direction (Z-direction). The calculator 215 calculates the angle θ2 between the slip direction calculated by the slip calculator 214 and the direction opposite to the gravity direction. The controller 211 causes the gripper 41 holding the work 42 to pivot by the angle calculated by the calculator 215, so as to align the slip direction calculated by the slip calculator 214 with the direction opposite to the gravity direction. By causing the gripper 41 to pivot as above, the force applied to the work 42 held by the gripper 41 in the slip direction can be balanced with the gravity, which may lead to cancellation of the slip of the work 42. In particular, when the work 42 slips in a direction different from the gravity direction, when the gripper 41 is holding the work 42 at a plurality of support points (e.g., two points), and the slip distance between the support points are different, the slip can be cancelled by causing the gripper 41 to pivot such that the slip direction is aligned with the direction opposite to the gravity direction. In this case, the work 42 can be prevented from slipping off, without the need to increase the grip torque of the gripper 41. Therefore, a wider variety of works 42 can be handled, and thus the robustness can be improved. Further, since the grip force is not increased, an increase in power consumption due to the increase in grip force can be suppressed, which leads to reduced power consumption.

Here, when the work is held by the end effector attached to the distal end of the arm, the work once held may slip off, depending on the shape or surface condition of the work. Accordingly, the control apparatus according to the foregoing background art includes a slip sensor provided in the end effector to detect the slip of the work being held, and increases the grip torque (grip force) of the end effector when the slip sensor detects a slip of the work, to prevent the work from slipping off.

With the control apparatus configured as above, however, since the grip force of the end effector is increased when the slip sensor detects a slip of the work, the work may be damaged because of the increase in grip force. Accordingly, the types of the work that can be handled are limited. In addition, the increase in grip force leads to an increase in power consumption, which is against the energy saving.

In contrast, the arrangement according to this embodiment prevents the object (work) from slipping off without the need to increase the grip torque of the end effector, and improves the robustness by widening the variety of the objects that can be handled.

At the distal end portion 15 of the arm 11, the pivot mechanism 18 that causes the gripper 41 holding the work 42 to pivot is provided. The pivotal shaft 18A of the pivot mechanism 18 is located at the center of the work 42 held by the gripper 41. The controller 211 rotates the pivotal shaft 18A of the pivot mechanism 18, to thereby cause the gripper 41 to pivot about the center of the work 42 held by the gripper 41. Thus, the gripper 41 is made to pivot, with the pivotal shaft 18A set to the position corresponding to the center of the work 42. Such an arrangement suppresses the centrifugal force applied to the work 42, thereby preventing the work 42 from slipping off owing to the centrifugal force applied thereto. In other words, the pivotal motion of the gripper 41 prevents the work 42 from slipping off.

In the case where a downward slip is detected with respect to a horizontal plane, after the gripper 41 is made to pivot such that the slip direction is aligned with the direction opposite to the gravity direction, it is presumed that basically the grip torque of the gripper 41 is insufficient, since the downward slip has taken place both before and after the gripper 41 was made to pivot. When the downward slip takes place as above after the gripper 41 is made to pivot, the grip torque of the gripper 41 is increased, so as to set the grip torque of the gripper 41 to the torque detected by the second detector 41D when the slip distance of the work 42 becomes zero. Through such an arrangement, the grip torque of the gripper 41 can be set to an optimum value, to properly hold the work 42 without incurring a slip.

Further, in the case where an upward slip is detected with respect to a horizontal plane, after the gripper 41 is made to pivot such that the slip direction is aligned with the direction opposite to the gravity direction, it is presumed that the grip torque of the gripper 41 is excessive. When the upward slip takes place as above after the gripper 41 is made to pivot, the grip torque of the gripper 41 is decreased, and the torque detected by the second detector 41D, when the slip distance of the work 42 becomes zero, is maintained. Through such an arrangement, the work 42 can be properly held without being made to slip, and therefore the power corresponding to the unnecessary grip force can be saved, which leads to reduced power consumption.

Figure 6:
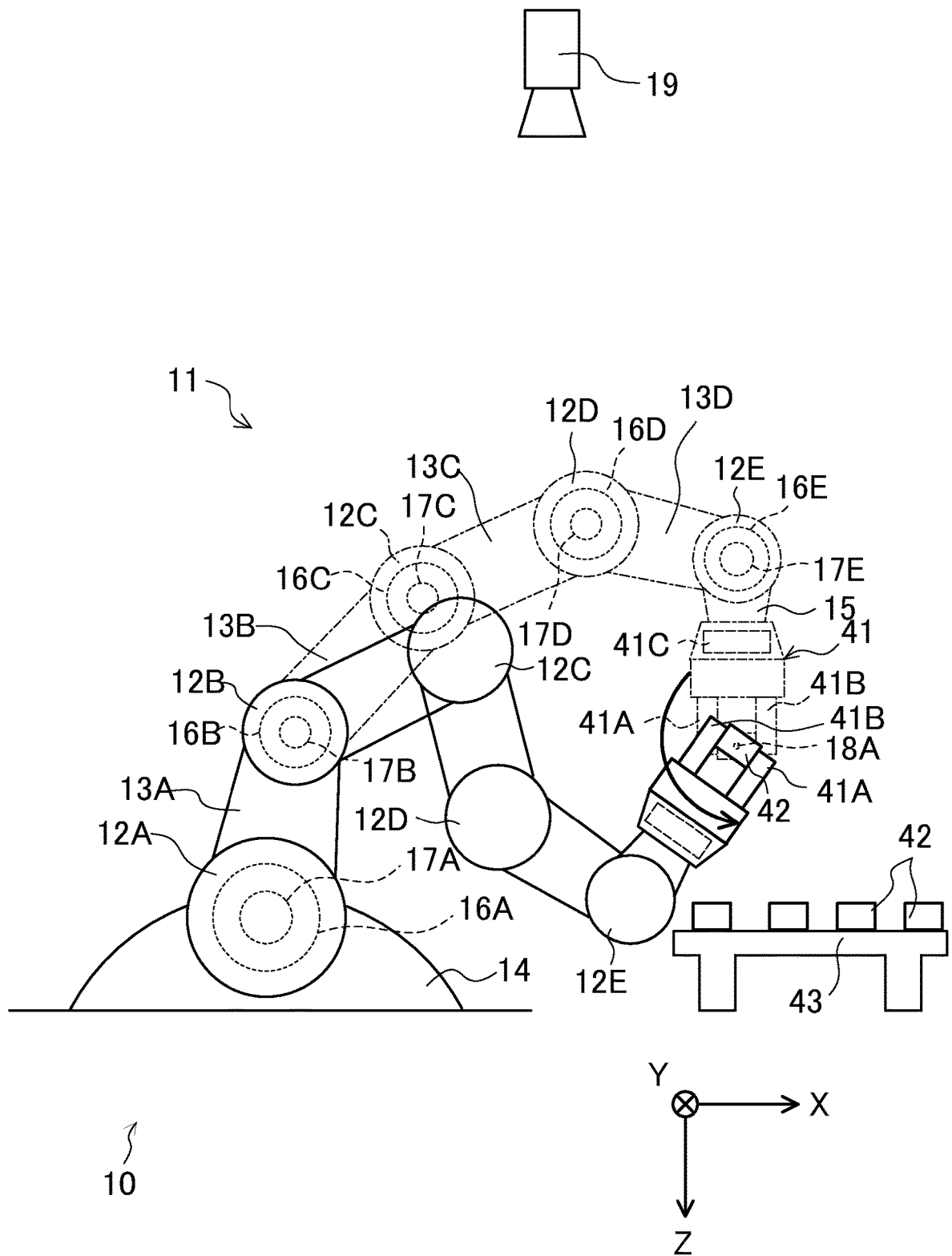
FIG. 6 is a schematic diagram illustrating the appearance of a robot according to a variation.

Although the end effector is attached to the pivot mechanism 18 (e.g., stepping motor) provided in the distal end portion 15 of the arm 11 in the foregoing embodiment, different configurations may be adopted. The robot 10 may be without the pivot mechanism 18, and the controller 211 may control the driver 16 to drive the joint 12, using a control parameter appropriate for the status of the robot 10, to thereby cause the gripper 41 to pivot by the angle calculated by the calculator 215 (e.g., 140°), as indicated by solid lines in FIG. 6.

Figure 7A:
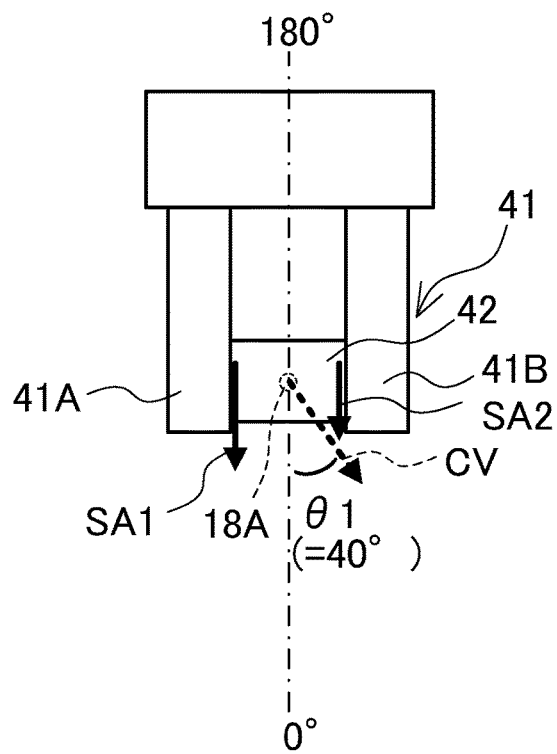
FIG. 7A is a schematic drawing for explaining a calculation method of the slip direction of the work, performed by the slip calculator.
Figure 7C:
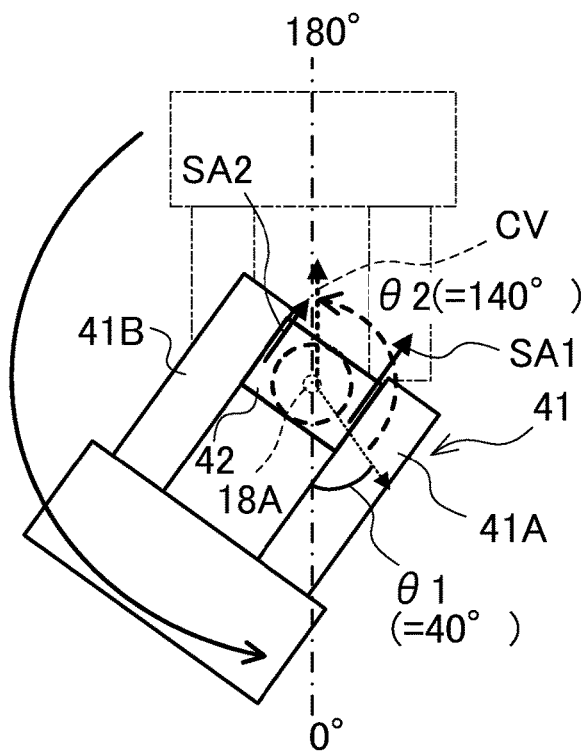
FIG. 7C is a schematic diagram illustrating the gripper pivoted by a pivot angle calculated by the calculator.
Figure 7B:
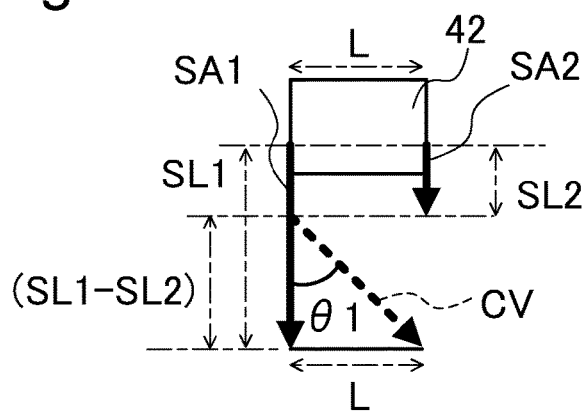
FIG. 7B is a schematic diagram illustrating a relation between the slip vectors and the synthesized vector.

For example, the slip calculator 214 may calculate, as in the foregoing embodiment, the angle θ1 defined by the slip direction of the work 42 with respect to the gravity direction as illustrated in FIG. 7B, with the equation (1) cited above. The controller 211 causes the gripper 41 holding the work 42 to pivot about the pivotal shaft 18A located at the position corresponding to the center of the work 42, by the angle calculated by the calculator 215 (140° in FIG. 7A), so that the slip direction calculated by the slip calculator 214 is aligned with the direction opposite to the gravity direction, as illustrated in FIG. 7C in which the gripper 41 has been pivoted by the angle calculated by the calculator 215 (i.e., 140°). By the mentioned pivotal motion, the slip direction of the work 42 illustrated in FIG. 7A is turned to the direction opposite to the gravity direction. In this state, the force applied to the work 42 held by the gripper 41 in the slip direction can be balanced with the gravity, which may lead to cancellation of the slip of the work 42. In other words, the work 42 can be held in a posture that prevents the work 42 from slipping.

Although the slip sensor 41F is provided in the claws 41A and 41B of the gripper 41, on the respective faces opposing the work 42, in the foregoing embodiment and variations, different configurations may be adopted. For example, a distributed contact sensor may be employed, in place of the slip sensor 41F. The distributed contact sensor provides the contact region between the work 42 and the claw 41A or 41B. In this case, the slip calculator 214 calculates the slip distance and the slip direction of the work 42, on the basis of the detection signal indicating temporal changes of the contact region, from the distributed contact sensor.

The disclosure is not limited to the foregoing embodiments, but may be modified in various manners. Further, the configurations and arrangements according to the foregoing embodiments and variations, described with reference to FIG. 1 to FIG. 7C, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. A control apparatus that controls an operation of a robot, the robot including an arm having a plurality of joints, and capable of freely moving in a three-dimensional space, a driver provided in each of the plurality of joints, to drive the joint, an end effector attached to a distal end of the arm, and configured to hold an object, a first detector that detects a position of the end effector, and a second detector that detects a grip torque with which the end effector holds the object, the control apparatus comprising a control device including a processor, and configured to act, when the processor executes a control program, as:
- a third detector that detects a slip direction of the object held by the end effector;
- a calculator that calculates an angle defined by the slip direction detected by the third detector and a direction opposite to a gravity direction; and
- a controller that causes the end effector holding the object to pivot by the angle calculated by the calculator, to align the slip direction detected by the third detector with the direction opposite to the gravity direction.

2. The control apparatus according to claim 1, wherein the controller causes the end effector to pivot, with a pivotal shaft of the end effector holding the object located at a position corresponding to a center of the object.

3. The control apparatus according to claim 1, wherein, when the third detector detects a downward slip with respect to a horizontal plane, after the end effector holding the object is made to pivot by the angle calculated by the calculator, the controller increases the grip torque of the end effector, and sets the grip torque of the end effector to a torque detected by the second detector when a slip distance of the object becomes zero.

4. The control apparatus according to claim 1, wherein, when the third detector detects an upward slip with respect to a horizontal plane, after the end effector holding the object is made to pivot by the angle calculated by the calculator, the controller decreases the grip torque of the end effector, and maintains a torque detected by the second detector when a slip distance of the object becomes zero.

5. The control apparatus according to claim 1, wherein the controller drives the end effector holding the object in the gravity direction, by an accelerating or decelerating operation.

6. The control apparatus according to claim 1, wherein:
the arm further includes a pivot mechanism that causes the end effector holding the object to pivot, the pivot mechanism being located at a distal end of the arm;
a pivotal shaft of the pivot mechanism is located at a position corresponding to a center of the object; and
the controller causes the end effector to pivot about the center of the object held by the end effector, by rotating the pivotal shaft of the pivot mechanism.

7. The control apparatus according to claim 1, wherein:
when the third detector detects a slip, the controller decides whether the end effector holding the object is located at a height that allows the end effector to pivot;
places the object, upon deciding that the end effector is not located at the height that allows the end effector to pivot;
increases the grip torque of the end effector from a torque of an immediately preceding time; and
causes the end effector to again hold the object.

8. The control apparatus according to claim 1, wherein:
when the third detector detects a slip, the controller decides whether the end effector holding the object is located at a height that allows the end effector to pivot; and
the third detector detects the slip direction of the object held by the end effector, when the controller decides that the end effector is located at the height that allows the end effector to pivot.

* * * * *